Jan. 8, 1929.
W. BRANDEGGER
1,698,296
SOUND PRODUCING DEVICE
Filed Jan. 20, 1925
2 Sheets-Sheet 1
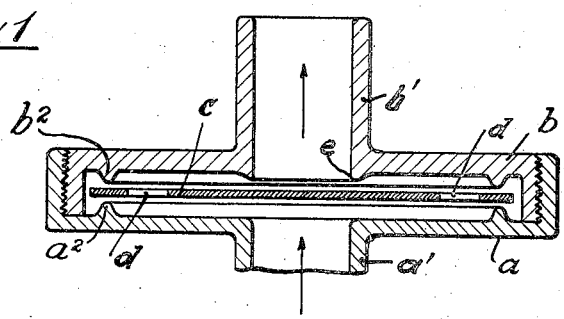
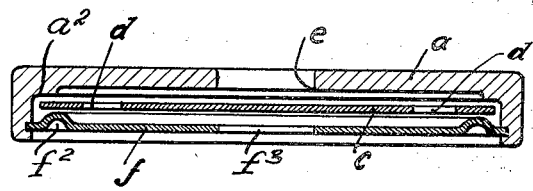
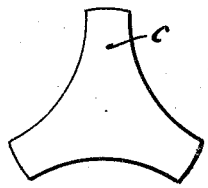 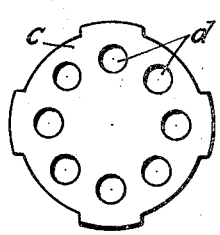 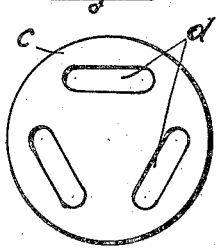 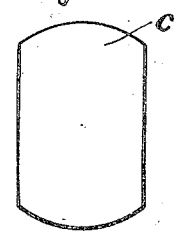
Inventor:
Willy Brandegger
by
Attorney.

Jan. 8, 1929.  W. BRANDEGGER  1,698,296

SOUND PRODUCING DEVICE

Filed Jan. 20, 1925   2 Sheets-Sheet 2

Inventor:
Willy Brandegger
by (signature)
Attorney.

Patented Jan. 8, 1929.

1,698,296

UNITED STATES PATENT OFFICE.

WILLY BRANDEGGER, OF STUTTGART, GERMANY, ASSIGNOR TO THE FIRM: EUGEN GRILL, SPEZIALMASCHINENFABRIK, OF SALZWIESEN, ZUFFENHAUSEN-STUTTGART, GERMANY.

SOUND-PRODUCING DEVICE.

Application filed January 20, 1925, Serial No. 3,615, and in Germany July 5, 1924.

My invention relates to devices for producing acoustic vibrations, and more especially to devices in which a diaphragm is set vibrating by means of a flowing medium such as air under pressure.

In devices of this kind as heretofore constructed the continuous flow of the medium under pressure is transformed into sound waves by means of tongues or plate-shaped valves. All these devices require a very exact adjustment and are subject to failure if dust or other foreign matter settles down on them. Moreover it is very difficult to remove the cause of failure and to render the devices operative again. Hand operation, for instance by means of a rubber bulb, is impracticable even for smaller sound intensities as the efficiency of the transformation is comparatively low.

I overcome these drawbacks by providing a diaphragm which cooperates after the manner of a valve with a seat surrounding the discharge opening for the flowing medium.

In the drawings affixed to this specification and forming part thereof, devices embodying my invention are illustrated diagrammatically by way of example.

In the drawings

Fig. 1 is a similar view showing a device in which the diaphragm is free to vibrate in the casing, Fig. 2 is a similar view of a device in which one part of the casing is replaced by a sheet metal cover or the like.

Figs. 5, 6, 7 and 8 illustrate various forms of diaphragms.

Figure 3:
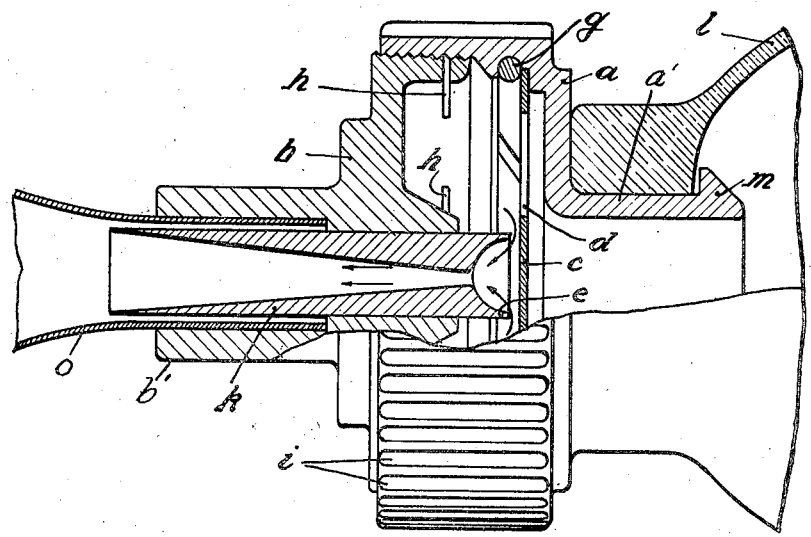
Fig. 3 is an axial section, partly in elevation, showing a device adapted to be operated by a rubber bulb.

The new device may be operated by any fluid under pressure supplied by suitable compressing means. As the device is very sensitive, it can be operated by means of a rubber bulb such as used for a bicycle horn, but steam or some other fluid can be used as well.

Throughout the drawings the diaphragm is marked $c$, its perforations are marked $d$, its seat is indicated by the letter $e$. With the exception of Fig. 2, the parts of the casing are indicated by the letters $a$ and $b$, and the supply and discharge pipes for the fluid by the letters $a'$ and $b'$, respectively.

Referring first to Fig. 1, the casing consists of two parts $a$ and $b$, which may be connected by threaded portions. The diaphragm $c$ may consist of any suitable metallic or non-metallic material, for instance, steel, tombac, aluminium, bone, celluloid, fibre, or the like. It should be noted that the nature of the material employed for the diaphragm does not play any important role whatever and there is no necessity for using high-class material.

A medium under pressure, such as air, is supplied to the casing through the pipe $a'$. A discharge pipe $b'$ is formed on the part $b$ of the casing, its inner edge $e$ surrounding the discharge opening and adjoining the middle portion of the diaphragm $c$ which cooperates with this edge after the manner of a valve. This valve portion of the diaphragm is solid. Perforations $d$, which may be circular as shown in Fig. 6 or substantially rectangular as shown in Fig. 7 or of any other suitable configuration, are formed in the marginal portions of the diaphragm at $d$.

Instead of perforating the diaphragm, it may be made partly cut away at the rim as shown in Fig. 8, or star-shaped as shown in Fig. 5, or serrated as shown in Fig. 6, or it may be a solid disc. In the latter case, the air will flow past the outer edges of the diaphragm instead of flowing through the perforations.

Air supplied to the casing through the pipe $a'$ acts towards forcing the diaphragm onto its seat $e$, whereupon the air escapes through the holes $d$. This causes the diaphragm to vibrate rapidly and these vibrations act towards producing loud sounds in the discharge pipe $b'$ and the sound tube (not shown). The volume and pitch of the sounds so produced are determined by the dimensions and proportions of the device, such as the size and weight of the diaphragm $c$, the size of the openings $d$, the distance of the diaphragm from its seat $e$ in its normal or inoperative position, and the volume of the chamber in the part $a$.

As shown in Fig. 1, the diaphragm $c$ is allowed to vibrate freely between shoulders $a''$ and $b''$ formed on the parts $a$ and $b$ of the casing. The diaphragm may be left perfectly free within the space defined by the shoulders or it may be held loosely between them. If desired, the vibrations of the diaphragm can be damped by a layer of some suitable material which is preferably secured in the places where the diaphragm is supported.

Obviously the casing may be of any suitable construction; for instance a sheet metal cover $f$ or the like may be inserted in the part $a$ as shown in Fig. 2. Air under pressure is admitted through an opening $f^3$ in the cover $f$.

Figure 4:
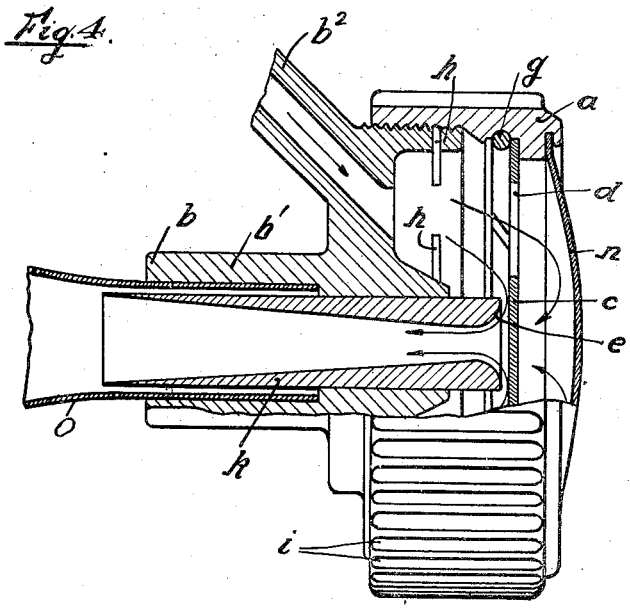
Fig. 4 is a similar view showing a device in which the air supply and discharge pipes are arranged on the same side of the casing.

Two further modifications are shown in Figs. 3 and 4. In both cases the diaphragm $c$ which is perforated at $d$ is held in the part $a$ by a split ring $g$ for instance a rubber ring. The part $a$ is provided with a threaded sleeve and is screwed on the part $b$. The threaded portion of part $b$ is provided with a slot or slots $h$ which extends substantially at right angles to the axis of the thread. By this means the thread is deformed and an elastic reaction is obtained which tends to distort the thread so that undesired relative movements of the parts is prevented even with the most severe shocks, while intentional adjustment is not interfered with. To facilitate such adjustment the threaded sleeve of the part $a$ is serrated at $i$.

The seat $e$ for the diaphragm $c$ is formed at the end of a nozzle $k$ which is constructed on the principles on which musical instruments, such as the mouth-piece of a trumpet, are designed. A sound tube $o$ is secured in the discharge pipe $b'$ of the part $b$.

A rubber bulb $l$ is fastened on the supply pipe $a'$ of the part $a$. The end of this pipe is formed with a conical extension having a shoulder $m$ at its free edge. By this means the aperture of the bulb $l$ is readily placed over the pipe $a$ and retained by the shoulder $m$. This construction involves the advantage as compared with the well known expedient of a plurality of annular projections, that a minimum stress is exerted on the bulb so that its life is increased and ordinary bulbs may be used.

In the modification shown in Fig. 4 the arrangement of parts is similar to that of Fig. 3 except for the fact that the supply pipe $b^2$ is arranged on the same side of the casing which carries the discharge pipe $b'$, both pipes being integral with the part $b$, and part $a$ being provided with a resilient cover $n$. The air from pipe $b^2$ flows partly through the space between the diaphragm and its seat $e$ on the nozzle $k$ and partly through the openings $d$ of the diaphragm. If the supply pipe is disposed on the front part $b$ of the casing, I obtain the advantage of a rigid connection being established between the supply pipe and the casing as is required to so support the part $b$ on a vehicle or the like that is not influenced by its vibrations.

If the walls of the casing are rigid, the starting of the device often involves difficulties so that special provisions must be made, such as slow increase of pressure and very exact adjustment. In order to avoid this drawback the walls of the casing can be made resilient wholly or in part, for instance by reducing the thickness of a wall or of part thereof, or by inserting a resilient wall $n$ as shown in Fig. 4. Instead of such a wall I may provide a second rubber bulb or the like. It is also possible to connect with the chamber surrounding the diaphragm another chamber or chambers which are partly resilient, such a chamber being for instance provided within the casing which the diaphragm vibrates.

Another expedient for facilitating the starting of the device consists in providing a hole in the casing connecting the chamber in which the diaphragm vibrates with the open air, such hole being so small that the quantity of air escaping through it is negligible as compared with the quantity of air required for operation.

The adjusting of the device can be effected by other expedients than the screwing of one part of the casing on the other. For instance the nozzle $k$ may be adjusted in relation to the diaphragm $c$ by means of a threaded sleeve or by displacing this nozzle in some other way. A sleeve may be mounted on the pipe $b'$ in Figs. 3 and 4 and may be connected with the nozzle by means of a pin extending through a slot.

The volume of the chamber in front of the diaphragm may be varied by suitable means, such as regulating screws or the like.

The means for displacing the nozzle $k$ and for increasing the volume of the chamber are well known in the art and are therefore not described in detail.

I wish it to be understood that I do not desire to be limited to the exact details of construction shown and described, for obvious modifications will occur to a person skilled in the art.

I claim:—

1. Sound producing device comprising a casing having an inlet and an outlet, a seat formed in said casing and a plate in said casing above said seat between said inlet and said outlet and being formed with perforations in the vibratory part intermediate the central and the outermost marginal portions of said plate.

2. Sound producing device comprising a casing having an air inlet and an air outlet, a seat in said casing and a plate arranged in said casing between said inlet and outlet for bodily displacement relative to said seat, said plate being solid in the central part to block the direct passage of air from said inlet to said outlet and apertured between said central part and its circumference.

3. Sound producing device comprising a casing having an air inlet and an air outlet, a seat in said casing and a plate arranged in said casing between said inlet and outlet for vibratory and free bodily movement relative to said seat, said plate being solid in the central part to block the direct passage of air from said inlet to said outlet and apertured between said central part and its circumference.

4. Sound producing device comprising a casing having an air inlet and an air outlet, two seats in said casing and a plate arranged in said casing between said inlet and outlet for bodily displacement relative to said seats, said plate being solid in the central part to block the direct passage of air from said inlet to said outlet and apertured between said central part and its circumference.

In testimony whereof I affix my signature.

WILLY BRANDEGGER.